US011928165B2

(12) United States Patent
Bao

(10) Patent No.: US 11,928,165 B2
(45) Date of Patent: Mar. 12, 2024

(54) METHOD FOR SEGMENTING PDF DOCUMENT AND METHOD FOR LOADING PDF DOCUMENT IN WEBPAGE

(71) Applicant: SHENZHEN SEKORM COMPONENT NETWORK CO., LTD, Shenzhen (CN)

(72) Inventor: Wei Bao, Shenzhen (CN)

(73) Assignee: SHENZHEN SEKORM COMPONENT NETWORK CO., LTD, Shenzhen (CN)

( * ) Notice: Subject to any disclaimer, the term of this patent is extended or adjusted under 35 U.S.C. 154(b) by 108 days.

(21) Appl. No.: 17/563,068

(22) Filed: Dec. 28, 2021

(65) Prior Publication Data

US 2022/0207090 A1    Jun. 30, 2022

(30) Foreign Application Priority Data

Dec. 30, 2020    (CN) .......................... 202011619052.9

(51) Int. Cl.
*G06F 16/93*    (2019.01)
*G06F 16/958*    (2019.01)

(52) U.S. Cl.
CPC ............ *G06F 16/93* (2019.01); *G06F 16/958* (2019.01)

(58) Field of Classification Search
CPC .............................. G06F 16/93; G06F 16/958
See application file for complete search history.

(56) References Cited

U.S. PATENT DOCUMENTS 7,305,612 B2 * 12/2007 Chakraborty ......... G06F 40/143
715/780
8,559,725 B2 * 10/2013 Du ..................... G06K 15/1822
382/294
11,049,235 B2 * 6/2021 Wheaton ................. G06F 16/93
(Continued)

FOREIGN PATENT DOCUMENTS

CN    101996162 A    3/2011
CN    103176952 A    6/2013
(Continued)

OTHER PUBLICATIONS

The extended European search report of EP application No. 21217785.1 dated May 25, 2022.
(Continued)

Primary Examiner — Merilyn P Nguyen
(74) Attorney, Agent, or Firm — Andrew C. Cheng

(57) ABSTRACT

The present invention relates to a method for segmenting a PDF document and a method for loading a PDF document in a webpage. The method for segmenting a PDF document includes: S101, inspecting whether a PDF document includes an original directory structure or not; S102, if yes, segmenting the PDF document into multiple PDF sub-documents according to the original directory structure; and S103, if no, segmenting the PDF document into multiple PDF sub-documents according to document contents of the PDF document and a lexical database corresponding to the PDF document. The present invention segments a PDF document into multiple PDF sub-documents to ease operations of for example online reviewing, downloading and searching of the PDF document, and improve a user's experience of use.

9 Claims, 2 Drawing Sheets

(56) References Cited

U.S. PATENT DOCUMENTS

| | | | |
|---|---|---|---|
| 2006/0174193 A1* | 8/2006 | Kikuchi | G06F 40/137 |
| | | | 715/255 |
| 2006/0187478 A1* | 8/2006 | Kongtcheu | G06F 3/1247 |
| | | | 358/1.15 |
| 2008/0082554 A1* | 4/2008 | Pedersen | G06F 16/93 |
| 2014/0201183 A1* | 7/2014 | Lin | G06F 16/9535 |
| | | | 707/706 |
| 2014/0355019 A1* | 12/2014 | Robinson | G06F 3/1241 |
| | | | 358/1.13 |
| 2015/0006552 A1* | 1/2015 | Lord | G06F 16/951 |
| | | | 707/752 |
| 2016/0344828 A1* | 11/2016 | Häusler | H04L 67/1044 |
| 2016/0364497 A1* | 12/2016 | Xiong | H04L 67/02 |
| 2017/0206043 A1 | 7/2017 | Boldt | |
| 2019/0102119 A1* | 4/2019 | Yoshida | G06F 40/169 |
| 2019/0238708 A1* | 8/2019 | Kozlovsky | G06F 16/93 |
| 2019/0278833 A1* | 9/2019 | Mukherjee | G06V 30/416 |
| 2020/0218439 A1* | 7/2020 | Kumar | G06F 16/954 |
| 2021/0097358 A1* | 4/2021 | Truong | G06F 3/1265 |
| 2021/0216763 A1* | 7/2021 | Dang | G06N 20/00 |
| 2021/0248420 A1* | 8/2021 | Zhong | G06V 10/82 |
| 2022/0319219 A1* | 10/2022 | Tsibulevskiy | G06T 3/60 |

FOREIGN PATENT DOCUMENTS

| | | |
|---|---|---|
| CN | 109600428 A | 4/2019 |
| CN | 110765385 A | 2/2020 |
| JP | 2002117019 A | 4/2002 |
| JP | 2009288870 A | 12/2009 |
| WO | 2020124687 A1 | 6/2020 |

OTHER PUBLICATIONS

Office Action of JP application No. 2021-209623 dated Mar. 7, 2023.
The first office action of CN application No. 202011619052.9 dated Dec. 1, 2023.
The search report of CN application No. 202011619052.9 dated Dec. 1, 2023.
Name of the author: Lukan Dejan, Title: PDF file format: Basic Structure, published Sep. 26, 2020 on INFOSEC. XP055921752 URL:https://resources.infosecinstitute.com/topic/pdf-file-format-basic%ADstructure/.
Lo Veg Rove W S et al:"Document analysis of PDF files: methods, results and implications", Electronic Publishing, Wiley, Chichester, GB, vol. 8, Jun. 1995 (Jun. 1995), pp. 207-220, XP002601971, ISSN: 0894-3982.
Song Mao et al:Document structure analysis algorithms: a literature survey, Proceedings of SPIE, IEEE, US, vol. 5010, Jan. 20, 2003, pp. 197-207, XP002355496, DOI: 10.1117/12.468423 ISBN: 978-1-62841-730-2.
The amendment of JP application No. 2000-302321 (Publication No. 2002-117019) filed on Oct. 24, 2007.

* cited by examiner

METHOD FOR SEGMENTING PDF DOCUMENT AND METHOD FOR LOADING PDF DOCUMENT IN WEBPAGE

FIELD OF THE INVENTION

The present invention relates to the field of PDF documents, and more particularly to a method for segmenting a PDF document and a method for loading a PDF document in a webpage.

DESCRIPTION OF THE RELATED ART

PDF (Portable Document Format) document is a commonly known document format and has been widely used in work and living. In some fields of business, the PDF documents used in some fields of business, such as technical specifications and service manuals, have a large amount of contents. Such lengthy text files are detrimental to online browsing, downloading, and searching by users. For example, for online document reading, a user must wait for the entire PDF being completely loaded before reading, and for document downloading, a user has to download the entire PDF document, these making the users' experiences poor.

SUMMARY OF THE INVENTION

The present invention is directed to a method for segmenting a PDF document and a method for loading a PDF document in a webpage.

In one aspect, a method for segmenting a PDF document comprises:

S101, inspecting whether a PDF document includes an original directory structure or not;

S102, if the PDF document includes an original directory structure, segmenting the PDF document into multiple PDF sub-documents according to the original directory structure; and S103, if the PDF document does not include an original directory structure, segmenting the PDF document into multiple PDF sub-documents according to document contents of the PDF document and a lexical database corresponding to the PDF document.

In some embodiments, the method for segmenting a PDF document further comprises, after Step S102:

S1041, determining whether or not page-number lengths of the PDF sub-documents are smaller than a first preset page-number length; and S1042, if yes, re-segmenting the PDF document according to an upper-level directory relative to the directory level to which the PDF sub-documents correspond.

In some embodiments, the method for segmenting a PDF document further comprises, after Step S102:

S1051, determining whether or not page-number lengths of the PDF sub-documents are larger than a second preset page-number length; and S1052, if yes, segmenting the PDF sub-documents into multiple PDF secondary sub-documents according to document contents of the PDF sub-documents and a lexical database to which the PDF sub-documents correspond.

In some embodiments, the method for segmenting a PDF document further comprises, after segmenting to obtain the PDF sub-documents or the PDF secondary sub-documents:

sequentially arranging the PDF sub-documents and the PDF secondary sub-documents according to positional sequences thereof in the PDF document.

In some embodiments, the method for segmenting a PDF document further comprises, after segmenting to obtain the PDF sub-documents or the PDF secondary sub-documents:

providing a jump tag on a document beginning or document ending of each PDF sub-document and each PDF secondary sub-document, the jump tag being provided for jumping to an adjacent PDF sub-documents or PDF secondary sub-document.

In some embodiments, the method for segmenting a PDF document further comprises, after segmenting to obtain the PDF sub-documents or the PDF secondary sub-documents:

providing a directory tag to which each PDF sub-document and each PDF secondary sub-document corresponds, and all the directory tags forming an indexing directory for all PDF sub-documents and PDF secondary sub-documents of the PDF document.

In some embodiments, in the method for segmenting a PDF document, providing a directory tag to which each PDF sub-document and each PDF secondary sub-document corresponds comprises:

generating, based on the document contents of each PDF sub-document or PDF secondary sub-document, a directory tag corresponding to each PDF sub-document or PDF secondary sub-document.

In some embodiments, in the method for segmenting a PDF document, in Step S3, segmenting the PDF document into multiple PDF sub-documents according to document contents of the PDF document and a lexical database corresponding to the PDF document comprises:

evaluating correlation and similarity of paragraphs of the PDF sub-documents according to the document contents of the PDF sub-documents and the lexical database to which the PDF sub-documents correspond, and taking paragraphs of which the correlation and similarity meet a preset standard as one PDF secondary sub-document.

In another aspect, a method for loading a PDF document in a webpage comprises:

S201, a webpage server segmenting a PDF document by following the PDF document segmentation method according to any one of above embodiments, in order to obtain multiple PDF sub-documents and PDF secondary sub-documents, and providing each of the PDF sub-documents and PDF secondary sub-documents with a corresponding network address;

S202, the webpage server receiving a visit request transmitted from an intelligent terminal for visiting the PDF document, and the webpage server transmitting back one of the PDF sub-documents or one of the PDF secondary sub-documents of the PDF document corresponding to the visit request;

S203, the intelligent terminal receiving and displaying the PDF sub-document or PDF secondary sub-document;

S204, the webpage server receiving successive visit requests transmitted from the intelligent terminal, and the webpage server transmitting back adjacently arranged PDF sub-documents or PDF secondary sub-documents among the PDF sub-documents or PDF secondary sub-documents;

S205, the intelligent terminal receiving and displaying the PDF sub-documents or PDF secondary sub-documents; and S206, repeatedly executing Step S204 and Step S205 to realize continuous displaying of the PDF sub-documents and the PDF secondary sub-documents of the PDF document.

In some embodiment, the method for loading a PDF document in a webpage further comprises:

S207, the webpage server receiving a download request transmitted from the intelligent terminal, and the webpage server transmitting back at least one of the PDF sub-documents or at least one of the PDF secondary sub-documents of the PDF document to which the download request corresponds; and S208, the intelligent terminal receiving and storing the PDF sub-documents or the PDF secondary sub-documents.

Implementation of the method for segmenting a PDF document and the method for loading a PDF document in a webpage according to the present invention provides the following beneficial effects. The present invention segments a PDF document into multiple PDF sub-documents to ease operations of for example online reviewing, downloading and searching of the PDF document, and improve a user's experience of use.

BRIEF DESCRIPTION OF THE DRAWINGS

A detailed description of the present invention will be provided below with reference to the attached drawings and embodiments, and in the drawings.

DETAILED DESCRIPTION OF PREFERRED EMBODIMENTS OF THE INVENTION

For better understanding of the technical features, purposes, and efficacy of the present invention, embodiments of the present invention will be described in detail with reference to the drawings.

Figure 1:
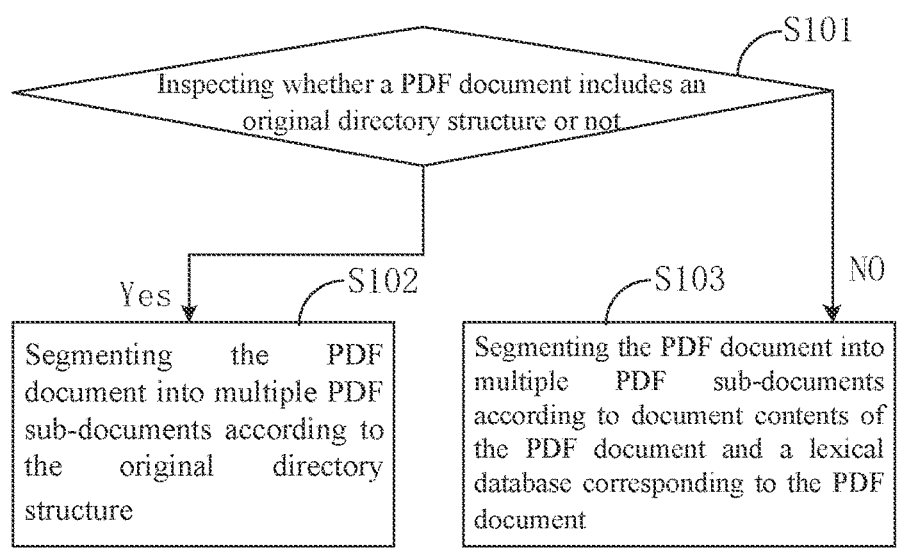
FIG. 1 is a flow chart illustrating a method for segmenting a PDF document provided in an embodiment.

In a preferred embodiment, referring to FIG. 1, a method for segmenting a PDF document according to the instant embodiment comprises the following steps:

S101, inspecting whether a PDF document includes an original directory structure or not.

Specifically, for a PDF document that has a large amount of contents, it is often that an original directory structure is provided at a beginning of the document. The original directory structure is provided for content indexing for the document, in order to allow a user to efficiently find a location where desired content is located. Of course, some PDF documents may not include an original directory structure. To process a PDF document, it needs to first inspect if the PDF document includes an original directory structure. Since the original directory structure often has a fixed format, a directory identification algorithm may be used to proceed with identification of the PDF document. The original directory structure comprises primary directory, secondary directory, tertiary directory, and so on, and the directory identification algorithm can be used to identify each of the directories of the original directory structure.

S102, if the PDF document is inspected to determine that the PDF document includes an original directory structure, then segmenting the PDF document into multiple PDF sub-documents according to the original directory structure.

Specifically, the original directory structure comprises a primary directory, a secondary directory, a tertiary directory, and so on, and each of the directories has a corresponding label and title in main text of the PDF document. The label and the title of the content of the PDF document that correspond to each directory of the original directory structure are identified, and the location of the label and the title of the content of the PDF document that correspond to each directory of the original directory structure is used as a segmenting point, to segment the PDF document into the multiple PDF sub-documents. It is appreciated that the segmenting point may be located at an arbitrary position of one arbitrary page of the PDF document, and segmentation is not conducted by taking the content of a complete page as a unit. Optionally, one of the different level directories of the original directory structure can be selected to serve as the segmenting point; for example, the primary directory may be used as the partitioning point, namely, the location where the label and the title of the primary directory are located in the content of a PDF document can be used as the segmenting point; further, for example, a secondary directory may be taken as a partitioning point, namely the location where the label and the title of the secondary directory are located in the content of a PDF document can be used as the segmenting point. Preferably, a lowest-level directory of the original directory is taken as the segmenting point, namely, the location of the label and the title of the lowest-level directory of the original directory in the content of the PDF document is used as the segmenting point. It is appreciated that the PDF sub-documents obtained through the segmenting still meet the format requirement of PDF documents, and are still PDF documents.

S103, if the PDF document is inspected to determine that the PDF document does not include an original directory structure, then segmenting the PDF document into multiple PDF sub-documents according to document contents of the PDF document and a lexical database to which the PDF document corresponds.

Specifically, if the PDF document does not include an original directory structure, then a related lexical database to which the PDF document corresponds is searched out. Optionally, in searching out the related lexical database to which the PDF document corresponds, the technical field to which the PDF document belongs can be relied upon for searching out the related lexical database in the field, and further, the document contents of the PDF document can be relied upon for searching for the technical field, where the technical field may be of multiple levels, and for the technical field so selected, the more specific, the better. The related lexemes have to be prepared in advance, and key lexemes for each technical field and the relationship among the lexemes are obtained based on rule of thumb or big data screening, so as to eventually obtain a related lexical database corresponding to each technical field. Then, the PDF document is segmented into multiple PDF sub-documents according to the document contents of the PDF document and the related lexical database to which the PDF document corresponds. That is to say, correlation and similarity among paragraphs of the PDF document are evaluated according to the document contents of the PDF document and the related lexical database to which the PDF document corresponds, and those paragraphs of which the correlation and similarity meet a preset standard are taken as one PDF sub-document. The correlation and similarity of adjacent paragraphs meeting the preset standard indicates the adjacent paragraphs describe the same subject matter or similar content, and these paragraphs are segmented out as one PDF sub-document. For example, if identical terms appear multiple times in adjacent paragraphs, then it is considered that the adjacent paragraphs describe the same subject matter or similar content.

The instant embodiment segments a PDF document into multiple PDF sub-documents to ease operations of for example online reviewing, downloading and searching of the PDF document, and improve a user's experience of use.

In some embodiments, the method for segmenting a PDF document further comprises, after Step S102, steps:

S1041, determining whether or not page-number lengths of the PDF sub-documents are smaller than a first preset page-number length. Specifically, the PDF sub-documents that are obtained through segmentation conducted according to the original directory structure may include a PDF sub-document having an excessively small number of pages, so that after the multiple PDF sub-documents are obtained through segmentation conducted according to the original directory structure, it is necessary to determine whether or not the page-number lengths of the PDF sub-documents are smaller than the first preset page-number length. If the page-number lengths of the PDF sub-documents are smaller than the first preset page-number length, then the PDF document is re-segmented according to an upper-level directory relative to the directory level to which the PDF sub-documents correspond; and if the page-number lengths of the PDF sub-documents are not smaller than the first preset page-number length, then no re-segmentation is necessary.

S1042, if the page-number lengths of the PDF sub-documents are smaller than the first preset page-number length, re-segmenting the PDF document according to an upper-level directory relative to the directory level to which the PDF sub-documents correspond, meaning the PDF document is re-segmented according to an upper-level directory relative to the directory level on which the PDF sub-documents are currently located, in order to have excessively small PDF sub-documents to be segmented into PDF sub-documents corresponding to the upper-level directory.

In the instant embodiment, re-segmentation is conducted with respective to the excessively small PDF sub-documents which are segmented into PDF sub-documents corresponding to an upper-level directory, so as to make lengths of the PDF sub-documents fall in a reasonable range.

In some embodiments, the method for segmenting a PDF document further comprises, after Step S102, steps:

S1051, determining whether or not page-number lengths of the PDF sub-documents are larger than a second preset page-number length. Specifically, the PDF sub-documents that are obtained through segmentation conducted according to the original directory structure may include a PDF sub-document having an excessively large number of pages, so that after the multiple PDF sub-documents are obtained through segmentation conducted according to the original directory structure, it is necessary to determine whether or not the page-number lengths of the PDF sub-documents are larger than the second preset page-number length. If the page-number lengths of the PDF sub-documents are larger than the second preset page-number length, then the PDF sub-documents are re-segmented into multiple PDF secondary sub-documents according to the document contents of the PDF sub-documents and the related lexical databases to which the PDF sub-documents correspond; and if the page-number lengths of the PDF sub-documents are not larger than the second preset page-number length, then no further processing is necessary.

S1052, if the page-number lengths of the PDF sub-documents are larger than the second preset page-number length, segmenting the PDF sub-documents into multiple PDF secondary sub-documents according to document contents of the PDF sub-documents and related lexical databases to which the PDF sub-documents correspond, meaning evaluating correlation and similarity of paragraphs of the PDF sub-documents according to the document contents of the PDF sub-documents and the related lexical databases to which the PDF sub-documents correspond, and taking paragraphs of which the correlation and similarity meet a preset standard as one PDF secondary sub-document. The correlation and similarity of adjacent paragraphs meeting the preset standard indicates the adjacent paragraphs are describing the same subject matter or similar content, and these paragraphs are segmented out together as one PDF sub-document. For example, if identical terms appear multiple times in adjacent paragraph, it is then considered that the adjacent paragraphs describe the same subject matter or similar content.

Optionally, for PDF secondary sub-documents being taken as PDF sub-documents, Step S1051 and Step S1052 are repeated until the lengths of the documents so segmented fall within a reasonable range.

The instant embodiment conducts re-segmentation with respect to excessively large PDF sub-documents according to the document contents and the related lexical databases to which the PDF sub-documents correspond, to avoid the PDF sub-documents being excessively lengthy and making lengths of the PDF sub-documents in a reasonable range.

In some embodiments, the method for segmenting a PDF document further comprises, after segmenting to obtain the PDF sub-documents or the PDF secondary sub-documents, a step: sequentially arranging the PDF sub-documents and the PDF secondary sub-documents according to positional sequences thereof in the PDF document, meaning the PDF sub-documents and the PDF secondary sub-documents are arranged in such a sequence as to be kept at the positions thereof in the PDF document. A user, when reviewing the segmented PDF sub-documents and PDF secondary sub-documents on an intelligent terminal may not realize that the PDF document has been subjected to segmentation.

In some embodiments, the method for segmenting a PDF document further comprises, after segmenting to obtain the PDF sub-documents or the PDF secondary sub-documents, a step: providing a jump tag on a document beginning or document ending of each PDF sub-document and each PDF secondary sub-document, the jump tag being provided for jumping to an adjacent PDF sub-document or PDF secondary sub-document. The jump tag can be provided as an automatic jump tag or a manual jump tag, wherein the automatic jump tag enables automatic jump to the adjacent PDF sub-document or PDF secondary sub-document, meaning when a user reaches the position of the jump tag of the PDF sub-document or PDF secondary sub-document that is being currently reviewed, the PDF document may automatically jump to an adjacent PDF sub-document or PDF secondary sub-document. The manual jump tag requires manual handling by the user, meaning the user, when reaching the position of the jump tag of the PDF sub-document or PDF secondary sub-document that is being currently reviewed, is required to manually click or slide the manual jump tag, so that jumping may be made to an adjacent PDF sub-document or PDF secondary sub-document after the manual handling is conducted. If it is an automatic jump tag, then it can be made invisible and is not displayed; if it is a manual jump tag, then it must be displayed. The instant embodiment provides a jump tag to enable jumping between adjacent ones of the PDF sub-documents or PDF secondary sub-documents obtained through segmentation.

In some embodiments, the method for segmenting a PDF document further comprises, after segmenting to obtain the PDF sub-documents or the PDF secondary sub-documents, a step: providing a directory tag to which each PDF sub-document and each PDF secondary sub-document corresponds, and all the directory tags form indexing directory for all PDF sub-documents and PDF secondary sub-documents of the PDF document. In other words, providing a directory tag to which each PDF sub-document and each PDF secondary sub-document corresponds comprises: generating, based on the document contents of each PDF sub-document or PDF secondary sub-document, a directory tag corresponding thereto, and the directory tag is different from the original directory structure of the PDF document, and is also different from a page number tag of the PDF document. The instant embodiment provides directory tags and indexing directory for the PDF sub-documents and the PDF secondary sub-documents obtained through segmentation to ease search by the user.

Figure 2:
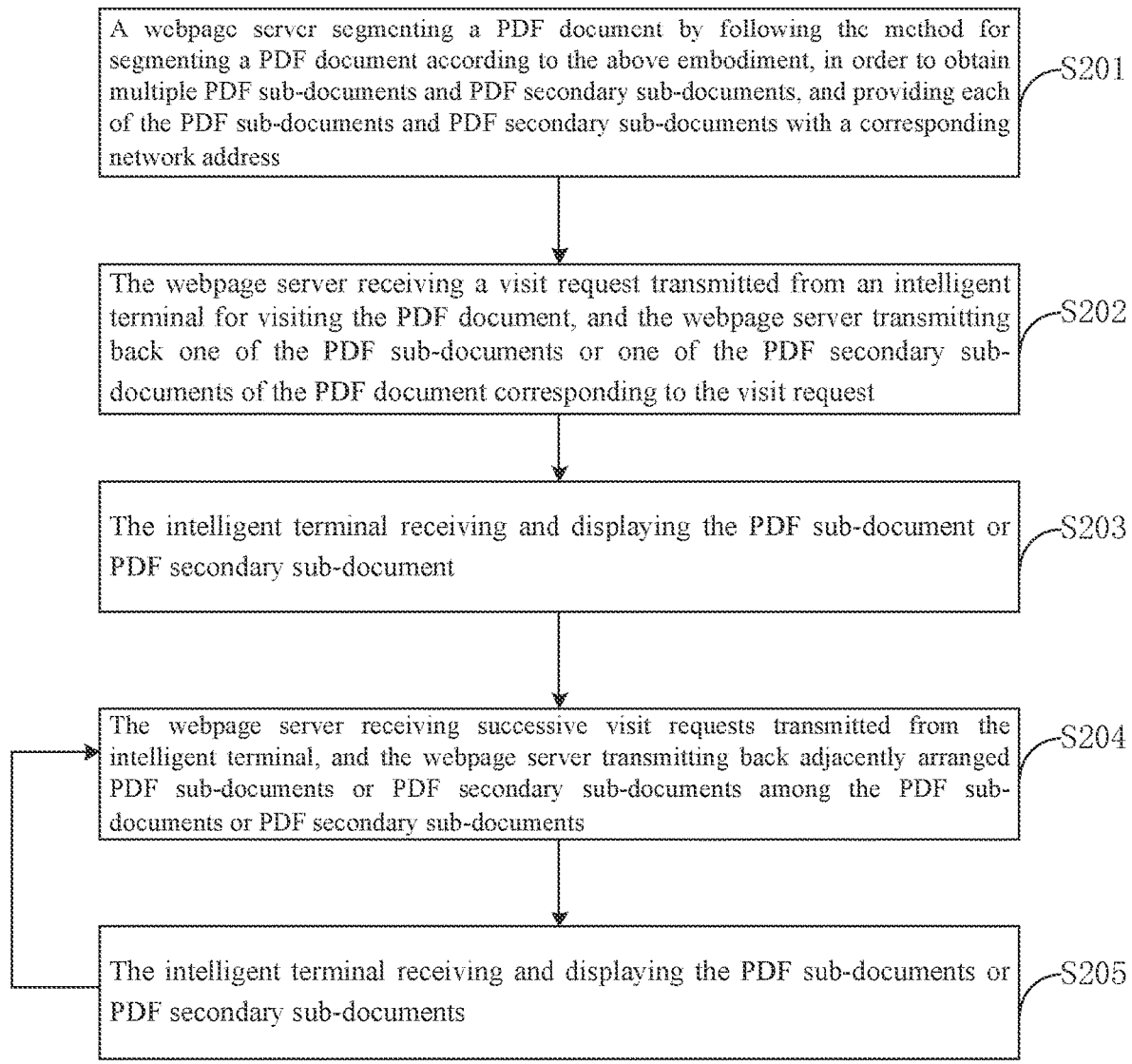
FIG. 2 is a flow chart illustrating a method for loading a PDF document in a webpage provided in an embodiment.

In a preferred embodiment, referring to FIG. 2, a method for loading a PDF document in a webpage according to the instant embodiment comprises the following steps:

S201, a webpage server segmenting a PDF document by following the PDF document segmentation method provided in the above embodiment in order to obtain multiple PDF sub-documents and PDF secondary sub-documents, and providing each of the PDF sub-documents and PDF secondary sub-documents with a corresponding network address.

S202, the webpage server receiving a visit request transmitted from an intelligent terminal for visiting the PDF document, and the webpage server transmitting back one of the PDF sub-documents or one of the PDF secondary sub-documents of the PDF document corresponding to the visit request. The visit request transmitted from the intelligent terminal may permit the visit of an arbitrary one of the PDF sub-documents or an arbitrary one of the PDF secondary sub-documents of the PDF document, meaning the visit request transmitted from the intelligent terminal may permit the visit of a PDF sub-document or PDF secondary sub-document that is ranked first in the PDF document, or alternatively the visit of a PDF sub-document or PDF secondary sub-document that is ranked in the middle in the PDF document, or alternatively the visit of a PDF sub-document or PDF secondary sub-document that is ranked last in the PDF document. Optionally, the intelligent terminal may be selected as a smart mobile phone, a tablet computer, a notebook computer, and a desktop computer, and the intelligent terminal is installed with an application program or browser for visiting the webpage server.

S203, the intelligent terminal receiving and displaying the PDF sub-document or PDF secondary sub-documents.

S204, the webpage server receiving successive visit requests transmitted from the intelligent terminal, and the webpage server transmitting back adjacently arranged PDF sub-documents or PDF secondary sub-documents among the PDF sub-documents or PDF secondary sub-documents.

S205, the intelligent terminal receiving and displaying the PDF sub-documents or PDF secondary sub-documents.

S206, repeatedly executing Step S204 and Step S205 to realize continuous displaying of the PDF sub-documents and the PDF secondary sub-documents of the PDF document. Preferably, the process is ended after all of the PDF sub-documents and the PDF secondary sub-documents of the PDF document have been displayed.

The instant embodiment segments a PDF document into multiple PDF sub-documents, and it only needs to load the PDF sub-documents or the PDF secondary sub-documents during a user's visit, so as to increase the loading speed and improve the user's experience of use.

In some embodiments, the method for loading a PDF document in a webpage further comprises the following steps:

S207, the webpage server receiving a download request transmitted from the intelligent terminal, and the webpage server transmitting back at least one of the PDF sub-documents or at least one of the PDF secondary sub-documents of the PDF document to which the download request corresponds.

S208, the intelligent terminal receiving and storing the PDF sub-documents or the PDF secondary sub-documents.

The instant embodiment segments a PDF document into multiple PDF sub-documents, and a user, with an attempt to download the PDF document, only needs to down a desired portion of the document, so that the user's experience of use can be improved.

A progressive way is adopted to illustrate various embodiments of the disclosure. The description of each embodiment focuses on key features that are different from those of other embodiments. Similar parts of the various embodiments may refer to each other. For the devices disclosed in the embodiments, since they are corresponding to the methods disclosed in the embodiments, and the descriptions thereof are relatively simplified, and the related parts may refer to the descriptions of the methods.

Skilled artisans may further notice that the units and method steps of each example of the embodiments disclosed in this disclosure can be implemented in hardware or computer software or a combination of the two. To clearly illustrate the exchangeability of hardware and software, the illustration provided above demonstrates the components and steps of each example with a general description according to functions thereof. Whether such functions can be implemented with hardware or software is determined by the specific application and design requirement conditions of the technical solution. Skilled artisans may adopt different ways to implement the functions so described for each specific application, and such implementations should not be regarded as exceeding the scope of the present invention.

The steps of the method or algorithm described with reference to the embodiments disclosed in the disclosure can be implemented directly by means of hardware, or by means of software modules executable in a processor, or a combination of the two. The software modules may be loaded in a random access memory (RAM), an internal storage, a read only memory (ROM), an electrically programmable ROM, an electrically erasable ROM, a register, a hard disc drive, a mobile magnetic drive, a CD-ROM, or any other forms of storage medium known in the field.

The embodiments provided above are only for illustration of the technical thoughts and features of the present invention, for the purposes to help those skilled in the art to understand the contents of the present invention and to accordingly put into practice, and should not be construed as limiting to the scope of protection for the present invention. All variations and modifications that are considered equivalent to the scope of the appended claims of the application belong to the scope of the present invention as defined solely by the appended claims.

What is claimed is:

1. A method for loading a PDF document in a webpage, comprising:

a webpage server segmenting a PDF document by using a method for segmenting a PDF document, in order to obtain multiple PDF sub-documents and PDF secondary sub-documents, and providing each of the PDF sub-documents and PDF secondary sub-documents with a corresponding network address;

the webpage server receiving a visit request transmitted from an intelligent terminal for visiting the PDF document, and the webpage server transmitting back one of the PDF sub-documents or one of the PDF secondary sub-documents of the PDF document corresponding to the visit request;

the intelligent terminal receiving and displaying the PDF sub-document or PDF secondary sub-document;

the webpage server receiving successive visit, requests transmitted from the intelligent terminal, and the webpage server transmitting back adjacently arranged PDF sub-documents or PDF secondary sub-documents among the PDF sub-documents or PDF secondary sub-documents;

the intelligent terminal receiving and displaying the PDF sub-documents or PDF secondary sub-documents; and repeatedly executing the steps of the webpage server receiving successive visit requests transmitted from the intelligent terminal the webpage server transmitting back adjacently arranged PDF sub-documents or PDF secondary sub-documents among the PDF sub-documents or PDF secondary sub-documents and the intelligent terminal receiving and displaying the PDF sub-documents or PDF secondary sub-documents to realize continuous displaying of the PDF sub-documents and the PDF secondary sub-documents of the PDF document, wherein the method for segmenting a PDF document comprises:

inspecting whether the PDF document includes an original directory structure or not;

if the PDF document includes an original directory structure, segmenting the PDF document into multiple PDF sub-documents according to the original directory structure; and if the PDF document does not include an original directory structure, segmenting the PDF document into multiple PDF sub-documents according to document contents of the PDF document and a lexical database corresponding to the PDF document.

2. The method for loading a PDF document in a webpage according to claim 1, further comprising, after the segmenting the PDF document into multiple PDF sub-document according to the original directory structure step:

determining whether or not page-number lengths of the PDF sub-documents are smaller than a first preset page-number length; and if yes, re-segmenting the PDF document according to an upper-level directory relative to the directory level to which the PDF sub-documents correspond.

3. The method for loading a PDF document in a webpage according to claim 1, further comprising, after the segmenting the PDF document into multiple PDF sub-document according to the original directory structure step:

determining whether or not page-number lengths of the PDF sub-documents are larger than a second preset page-number length; and if yes, segmenting the PDF sub-documents into multiple PDF secondary sub-documents according to document contents of the PDF sub-documents and a lexical database to which the PDF sub-documents correspond.

4. The method for loading a PDF document in a webpage according to claim 3, further comprising, after segmenting to obtain the PDF sub-documents or the PDF secondary sub-documents:

sequentially arranging the PDF sub-documents and the PDF secondary sub-documents according to positional sequences thereof in the PDF document.

5. The method for loading a PDF document in a webpage according to claim 4, further comprising, after segmenting to obtain the PDF sub-documents or the PDF secondary sub-documents:

providing a jump tag on a document beginning or document ending of each PDF sub-document and each PDF secondary sub-document, the jump tag being provided for jumping to an adjacent PDF sub-document or PDF secondary sub-document.

6. The method for loading a PDF document in a webpage according to claim 4, further comprising, after segmenting to obtain the PDF sub-documents or the PDF secondary sub-documents:

providing a directory tag to which each PDF sub-document and each PDF secondary sub-document corresponds, and all the directory tags forming an indexing directory for all PDF sub-documents and PDF secondary sub-documents of the PDF sub-documents.

7. The method for loading a PDF document in a webpage according to claim 6, wherein providing a directory tag to which each PDF sub-document and each PDF secondary sub-document corresponds comprises:

generating, based on the document contents of each PDF sub-document or PDF secondary sub-document, a directory tag corresponding to each PDF sub-document or PDF secondary sub-document.

8. The method for loading a PDF document in a webpage according to claim 1, wherein segmenting the PDF document into multiple PDF sub-documents according to document contents of the PDF document and a lexical database corresponding to the PDF document comprises:

evaluating correlation and similarity of paragraphs of the PDF sub-documents according to the document contents of the PDF sub-documents and the lexical databases to which the PDF sub-documents correspond, and taking paragraphs of which the correlation and similarity meet a preset standard as one PDF secondary sub-document.

9. The method for loading a PDF document in a webpage according to claim 1, further comprising:

the webpage server receiving a download request transmitted from the intelligent terminal, and the webpage server transmitting back at least one of the PDF sub-documents or at least one of the PDF secondary sub-documents of the PDF document to which the download request corresponds; and the intelligent terminal receiving and storing the PDF sub-documents or the PDF secondary sub-documents.

\* \* \* \* \*